US012659883B2

(12) United States Patent　　(10) Patent No.: US 12,659,883 B2
Enescu et al.　　(45) Date of Patent: Jun. 16, 2026

(54) SIGNALLING PROCESS

(71) Applicant: Nokia Technologies Oy, Espoo (FI)

(72) Inventors: Mihai Enescu, Espoo (FI); Samantha Caporal Del Barrio, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 310 days.

(21) Appl. No.: 18/553,895

(22) PCT Filed: Mar. 28, 2022

(86) PCT No.: PCT/EP2022/058046
§ 371 (c)(1),
(2) Date: Oct. 4, 2023

(87) PCT Pub. No.: WO2022/218677
PCT Pub. Date: Oct. 20, 2022

(65) Prior Publication Data
US 2024/0179643 A1　　May 30, 2024

(30) Foreign Application Priority Data

Apr. 12, 2021　(FI) ..................................... 20215431

(51) Int. Cl.
*H04W 52/36* (2009.01)
*G01S 7/00* (2006.01)
(Continued)

(52) U.S. Cl.
CPC ........... *H04W 52/367* (2013.01); *G01S 7/006* (2013.01); *G01S 13/08* (2013.01); *H04W 52/283* (2013.01)

(58) Field of Classification Search
CPC ... H04W 62/36; H04W 52/367; H04W 52/28; H04W 52/283; G01S 7/00; G01S 7/006; G01S 13/08
See application file for complete search history.

(56) References Cited

U.S. PATENT DOCUMENTS 9,515,771 B2 * 12/2016 Venkob ............. H04W 52/0229
9,655,056 B2 * 5/2017 Hao ....................... H01Q 1/245
(Continued)

FOREIGN PATENT DOCUMENTS

WO　　2022/218671 A1　10/2022

OTHER PUBLICATIONS

"3rd Generation Partnership Project; Technical Specification Group Radio Access Network; NR; Physical layer procedures for control (Release 16)", 3GPP TS 38.213, V16.4.0, Dec. 2020, pp. 1-181.
(Continued)

*Primary Examiner* — Hai V Nguyen
(74) *Attorney, Agent, or Firm* — Carter, DeLuca & Farrell LLP

(57) ABSTRACT

According to an example aspect of the present invention, there is provided an apparatus, for example a user equipment, configured to transmit, to a base station node, a request for at least one gap to be configured in an uplink transmission and/or downlink reception of the apparatus, during at least one configured gap of the apparatus, use at least one antenna array of the apparatus as a radar to determine a distance between the apparatus and a user or an object, and responsive to the determined distance being less than a preconfigured trigger distance, reduce a transmission power of the apparatus by a factor chosen in dependence of by how much the determined distance is less than the trigger distance.

1 Claim, 7 Drawing Sheets

(51) Int. Cl.
  *G01S 13/08*      (2006.01)
  *H04W 52/28*      (2009.01)

(56) References Cited

U.S. PATENT DOCUMENTS

| | | | | |
|---|---|---|---|---|
| 10,714,840 | B1 * | 7/2020 | West | H01Q 21/30 |
| 11,159,279 | B2 * | 10/2021 | Han | H04W 28/02 |
| 11,320,511 | B2 * | 5/2022 | Tenny | G01S 5/0236 |
| 11,324,014 | B2 * | 5/2022 | Sampath | H04B 1/3838 |
| 2009/0325580 | A1 | 12/2009 | Kazmi et al. | |
| 2014/0162592 | A1 * | 6/2014 | Peitzer | H04B 1/3838 |
| | | | | 455/405 |
| 2014/0341192 | A1 * | 11/2014 | Venkob | H04W 52/0216 |
| | | | | 370/336 |
| 2016/0270001 | A1 * | 9/2016 | Hao | H04M 1/737 |
| 2019/0101615 | A1 * | 4/2019 | Tenny | G01S 5/10 |
| 2019/0200365 | A1 * | 6/2019 | Sampath | H04B 1/3838 |
| 2019/0219623 | A1 * | 7/2019 | Varel | G01R 29/0871 |
| 2019/0222326 | A1 * | 7/2019 | Dunworth | H04B 17/13 |
| 2019/0261289 | A1 | 8/2019 | Raghavan et al. | |
| 2020/0162205 | A1 * | 5/2020 | Han | H04W 52/48 |
| 2020/0411960 | A1 | 12/2020 | Ng et al. | |

OTHER PUBLICATIONS

"3rd Generation Partnership Project; Technical Specification Group Radio Access Network; NR; Physical layer procedures for data (Release 16)", 3GPP TS 38.214, V16.4.0, Dec. 2020, pp. 1-169.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"UL gaps for Tx power management", 3GPP TSG-RAN WG4 Meeting #98-e, R4-2100218, Agenda: 11.3.4.1, Apple, Jan. 25-Feb. 5, 2021, pp. 1-7.

"WF on FR2 enhancement part 3: UL gap", 3GPP TSG-RAN WG4#97-e Meeting, R4-2016919, Apple, Nov. 2-13, 2020, pp. 1-6.

Office action received for corresponding Finnish Patent Application No. 20215431, dated Oct. 8, 2021, 9 pages.

Office action received for corresponding Finnish Patent Application No. 20215431, dated Mar. 16, 2022, 7 pages.

International Search Report and Written Opinion received for corresponding Patent Cooperation Treaty Application No. PCT/EP2022/058046, dated Jul. 22, 2022, 13 pages.

Office Action received for corresponding European Patent Application No. 22718657.4, dated Mar. 17, 2025, 8 pages.

European Communication for Application No. 22 718 657.4 dated Mar. 17, 2025, 8 pages total.

* cited by examiner

300

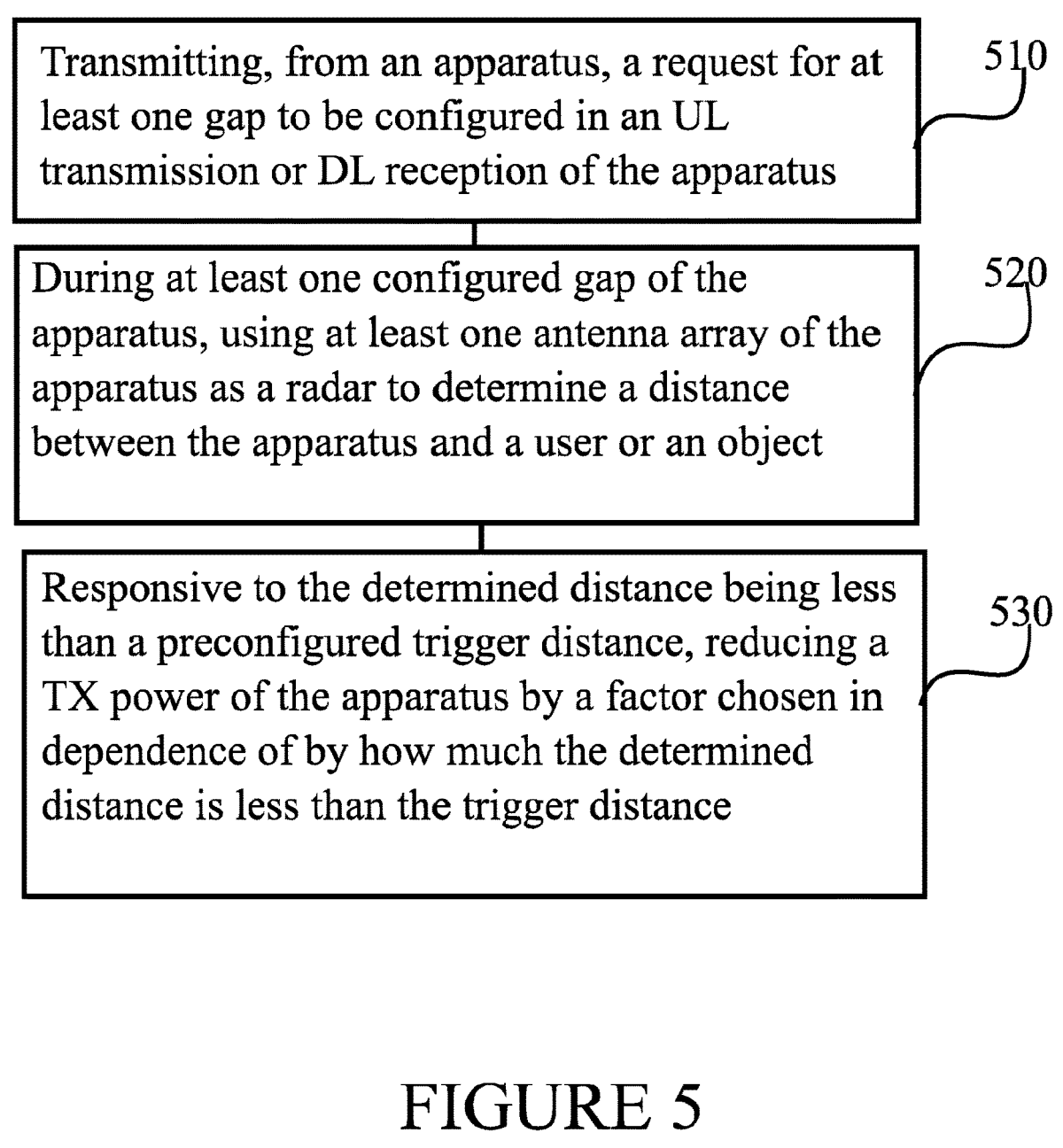

Transmitting, from an apparatus, a request for at least one gap to be configured in an UL transmission or DL reception of the apparatus — 510

During at least one configured gap of the apparatus, using at least one antenna array of the apparatus as a radar to determine a distance between the apparatus and a user or an object — 520

Responsive to the determined distance being less than a preconfigured trigger distance, reducing a TX power of the apparatus by a factor chosen in dependence of by how much the determined distance is less than the trigger distance — 530

FIGURE 5

Receiving, from a user equipment, UE, a request for at least one gap to be configured in an UL transmission and/or DL reception of the UE    610

Transmitting to the UE a gap configuration defining at least one gap in the UL transmission and/or DL reception of the UE    620

SIGNALLING PROCESS

RELATED APPLICATION

This application was originally filed as PCT Application No. PCT/EP2022/058046 on Mar. 28, 2022, which claims priority from Finland Application No. 20215431, filed on Apr. 12, 2021, each of which is incorporated herein by reference in its entirety.

FIELD

The present disclosure relates to managing transmission in wireless communication.

BACKGROUND

Maximum permissible exposure, MPE, regulation defines regulatory requirements and limits how much radiated power devices, such as user equipments, such as portable devices, may transmit as electromagnetic, EM, radiation when a human body is in close proximity of the device. For example, at frequencies above 6 GHZ, the Federal communications commission, FCC, of the United States has defined limits on exposure. This frequency range overlaps with the FR2 frequency range of fifth generation, 5G, communication systems as defined by the third generation partnership project, 3GPP. Overall, predefined limits on exposure of a user to electromagnetic radiation may be established to ensure users do not risk biological effects of such radiation. An example of a biological effect is a warming of tissue.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to transmit, to a base station node, a request for at least one gap to be configured in an uplink transmission and/or downlink reception of the apparatus, during at least one configured gap of the apparatus, use at least one antenna array of the apparatus as a radar to determine a distance between the apparatus and a user or an object, and responsive to the determined distance being less than a preconfigured trigger distance, reduce a transmission power of the apparatus by a factor chosen in dependence of by how much the determined distance is less than the trigger distance.

According to a second aspect of the present disclosure, there is provided an apparatus comprising at least one processing core, at least one memory including computer program code, the at least one memory and the computer program code being configured to, with the at least one processing core, cause the apparatus at least to receive, from a user equipment, a request for at least one gap to be configured in an uplink transmission and/or downlink reception of the user equipment, and transmit to the user equipment a gap configuration defining at least one gap in the uplink transmission and/or the downlink reception of the user equipment.

According to a third aspect of the present disclosure, there is provided a method comprising transmitting, from an apparatus to a base station node, a request for at least one gap to be configured in an uplink transmission and/or downlink reception of the apparatus, during at least one configured gap of the apparatus, using at least one antenna array of the apparatus as a radar to determine a distance between the apparatus and a user or an object, and responsive to the determined distance being less than a preconfigured trigger distance, reducing a transmission power of the apparatus by a factor chosen in dependence of by how much the determined distance is less than the trigger distance.

According to a fourth aspect of the present disclosure, there is provided a method, comprising receiving, from a user equipment, a request for at least one gap to be configured in an uplink transmission and/or downlink reception of the user equipment, and transmitting to the user equipment a gap configuration defining at least one gap in the uplink transmission and/or the downlink reception of the user equipment.

According to a fifth aspect of the present disclosure, there is provided an apparatus comprising means for transmitting, from an apparatus to a base station node, a request for at least one gap to be configured in an uplink transmission and/or downlink reception of the apparatus, means for, during at least one configured gap of the apparatus, using at least one antenna array of the apparatus as a radar to determine a distance between the apparatus and a user or an object, and means for, responsive to the determined distance being less than a preconfigured trigger distance, reducing a transmission power of the apparatus by a factor chosen in dependence of by how much the determined distance is less than the trigger distance.

According to a sixth aspect of the present disclosure, there is provided an apparatus comprising means for receiving, from a user equipment, a request for at least one gap to be configured in an uplink transmission and/or downlink reception of the user equipment, and means for transmitting to the user equipment a gap configuration defining at least one gap in the uplink transmission and/or the downlink reception of the user equipment.

According to a seventh aspect of the present disclosure, there is provided a non-transitory computer readable medium having stored thereon a set of computer readable instructions that, when executed by at least one processor, cause an apparatus to at least transmit, to a base station node, a request for at least one gap to be configured in an uplink transmission and/or downlink reception of the apparatus, during at least one configured gap of the apparatus, use at least one antenna array of the apparatus as a radar to determine a distance between the apparatus and a user or an object, and responsive to the determined distance being less than a preconfigured trigger distance, reduce a transmission power of the apparatus by a factor chosen in dependence of by how much the determined distance is less than the trigger distance.

According to an eighth aspect of the present disclosure, there is provided a non-transitory computer readable medium having stored thereon a set of computer readable instructions that, when executed by at least one processor, cause an apparatus to at least receive, from a user equipment, a request for at least one gap to be configured in an uplink transmission and/or downlink reception of the user equipment, and transmit to the user equipment a gap configuration defining at least one gap in the uplink transmission and/or the downlink reception of the user equipment.

BRIEF DESCRIPTION OF THE DRAWINGS

FIG. 5 is a flow graph of a method in accordance with at least some embodiments of the present invention;

EMBODIMENTS

As will be disclosed herein, an enhanced method for requesting transmission gaps for a user equipment is provided, enabling re-using an antenna array, such as an antenna panel, of the user equipment as a radar to determine a distance between the user equipment, UE, and a human user. This determined distance may be used to decide, whether a transmission power of the user equipment should be reduced, and if so by how much the transmission power should be reduced. Reducing the transmission power provides the benefit that the user is exposed to less electromagnetic radiation. Advantageously, gaps may be requested and configured for specific ones of active uplink and/or downlink transmission configurations, of the user equipment. Such transmission configuration-specific gaps may in practice be specific to an antenna array or an antenna panel, or to a subset of antenna arrays or antenna panels of the UE. Thus gaps may effectively be requested in a manner specific to a proper subset of the set of antenna arrays, or active transmission configurations, such as TCIs, of the UE. Such a proper subset of active transmission configurations may in practice be handled by a same antenna array.

Figure 1:
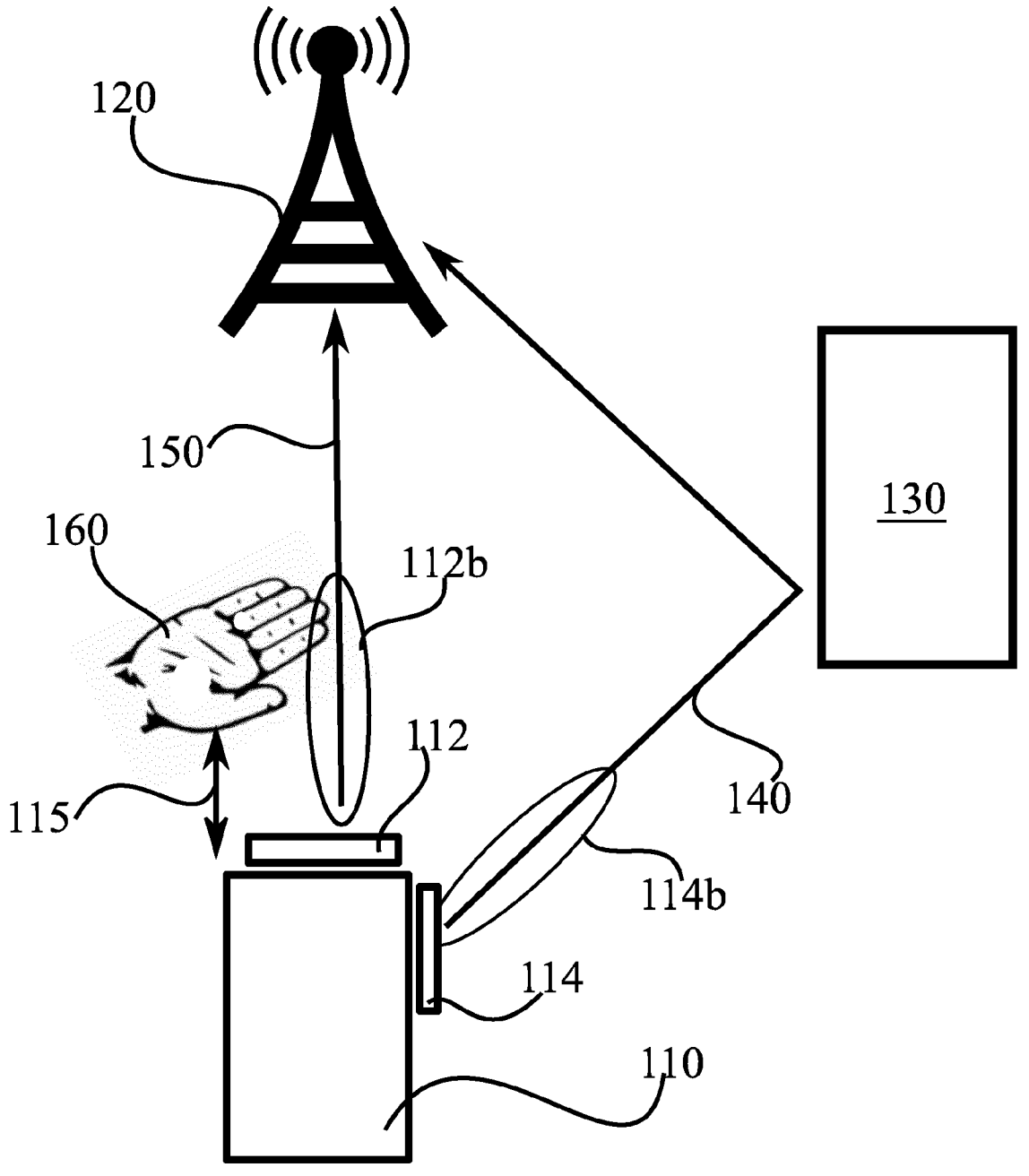
FIG. 1 illustrates an example system in accordance with at least some embodiments of the present invention.

FIG. 1 illustrates an example system in accordance with at least some embodiments of the present invention. The system comprises user equipment, UE, 110 and base station node 120, which will be referred to herein simply as base station 120 for the sake of brevity. Depending on the specific technology used, the base station may be referred to using different names as well, such as "access point" or "gNB", however "base station" is used in the present disclosure with no limitation to specific access technologies. UE 110 may comprise a user device, such as a smartphone, feature phone, tablet computer, laptop computer or desktop computer, for example. In the example of FIG. 1, base station 120 is a cellular base station, however the present disclosure is not limited to cellular systems, such as long term evolution, LTE, and fifth generation, 5G, and is applicable also to non-cellular systems, such as wireless local area network, WLAN, or worldwide interoperability for microwave access, WiMAX.

UE 110 is in wireless communication with base station 120 over two radio paths 150, 140 received and transmitted over corresponding beams 112b, 114b. Of these, radio path 150 is a direct line-of-sight path and radio path 140 involves a reflection from building 130. In normal use, beam 112b, serving radio path 150, would be predominant. The transmit beams 112b, 114b may use two distinct antenna arrays 112, 114, or antenna panels, of UE 110. Herein the term antenna array will be used, whereby it is not meant to exclude that they may be antenna panels. Base station 120 has two corresponding receive beams configured to receive transmit beams 112b, 114b of UE 110, respectively.

UE 110 is configured to determine that the user 160, or an object, is near UE 110, as illustrated. The distance between the user, represented here by the user's hand, and UE 110 is denoted as distance 115 in FIG. 1. Of course, any part of the user may be nearest to UE 110, for example where the UE is a smartphone, the nearest body part of the user may be the head, for example, depending on the situation. Taking into account the used transmit power, UE 110 may determine that a preconfigured electromagnetic user exposure limit is exceeded, or will soon be exceeded, and responsive this determination UE 110 may reduce its transmit power such that the exposure limit is not, or will not be, exceeded. The exposure limit at a specific user-UE distance 115 may be expressed in terms of effective isotropic radiated power, EIRP, of the UE, for example. An exposure limit may be set to control a risk of tissue damage from electromagnetic radiation absorbed in the tissue. The exposure limit may be specific to a frequency, or a frequency range. In particular, a frequency range of 24 to 300 gigahertz, GHz. This frequency range is of interest in millimetre-wave, mmWave, communication.

The exposure limit may be expressed as a function of the distance 115 between the UE and the user, such that a trigger distance is defined. In particular, the exposure limit may be expressed as a maximum allowed transmit power as a function of distance 115. When distance 115 is greater than the trigger distance, the UE need not reduce its transmission power from a nominal value. However, when distance 115 is less than the trigger distance UE 110 must reduce its transmission power, or, more accurately, UE 110 must reduce the maximum allowed transmission power of UE 110. The exposure limit may be expressed as a function in terms of distance 115, such that the reduction in transmission power increases as distance 115 decreases. For example, the reduction in transmission power may increase in a continuous manner as a function of decreasing distance 115. As a yet further example, the reduction in transmission power may increase in a continuous and linear manner as a function of decreasing distance 115. As distance 115 approaches zero, the reduction in transmission power approaches a maximum reduction. Thus knowing distance 115 enables choosing a transmission power reduction factor for UE 110 such that UE 110 may transmit with the highest power possible without infringing the exposure limit. Advantageously, the reduction factor may be chosen as a function of distance 115 between no reduction and the maximum reduction, so that the transmit power may be kept as high as possible, while respecting the exposure limit. This provides better connectivity than triggering the maximum reduction at once when distance 115 is less than the trigger distance. When distance 115 increases toward the trigger distance, the maximum transmit power of the UE may be again increased, in accordance with the exposure limit.

Maximum permissible exposure, MPE, is the regulation on power density for the mmWave regime. The Federal Communications Commission, FCC, and the International Commission on Non-Ionizing Radiation Protection, ICNIRP, have set the threshold for MPE in terms of absorbed power at 10 W/m² (1 mW/cm²), for the general public, in the frequency range between 6 or 10 GHz respectively and 100 GHz. The power absorbed by the human body increases as distance 115 grows shorter. Therefore, to comply with the MPE limit, the UE might have to reduce its output power if the user gets in close vicinity of the transmit antenna array. As some 5G bands operate at very high frequencies of 24.25 GHz and above, they require high gain antennas to maintain a wireless connection. However, high gain antennas direct a high power the user may be exposed to. This creates a risk the FCC exposure limit, MPE, or indeed another exposure limit, may be exceeded. The UE must always comply with exposure limits, such as MPE, and consequently reduce its transmit power if the user approaches within the trigger distance of the antenna array(s) when transmission is active in the uplink. A concern is that significantly reducing the output power may to lead to losing the connection to base station 120, a scenario known as a Radio Link Failure, RLF.

Determining the distance between UE and user may be performed during configured gaps in the uplink or downlink. When an antenna array isn't used in transmitting in the uplink, it is available for other uses. As disclosed herein, the number of gaps configured in the UE is budgeted optimally to the needs of each UE. As transmission configurations, such as transmission configuration indicator, TCI, states are linked with UE activity in terms of antenna arrays, it means that if the gaps are defined specifically for individual transmission configurations, the base station can scale the needed amount of gaps. In fact, the correct categorization with regard to the number of gaps is also related to UE capability in terms of gap utilization. Advanced devices, equipped with sensors may not need to make use of antenna arrays for measurement of distance 115. These devices may report to the base station the no need for gaps to measure distance 115, although they may still need gaps for power amplifier calibration.

Four embodiments are envisioned to handle gaps to measure distance 115. Firstly, devices which don't need gaps may simply omit requesting the gaps, or provide requests requesting zero gaps, unless needed for other reasons. Secondly, devices capable, and willing, to use their antenna arrays to measure distance 115 at the same time may request exactly a single gap to be provided for determining the distance between UE and user. Thirdly, gaps may be requested for specific configured transmission configuration states of the UE, such as TCIs, for example. Lastly, gaps may be requested in terms of an overall gap budget for the UE, that is, for all the TCIs and antenna arrays. In this last case, specific gap configurations are not associated with specific transmission configurations. Rather, they may be applied to all transmission configurations, for example. The UE may indicate in its gap request a needed gap length, for example in terms of symbols, the UE needs for ranging the user, or object. A gap may be configured to have a length of, for example, one symbol, two symbols, three symbols or four symbols.

Figures 2A, 2B, 2C:
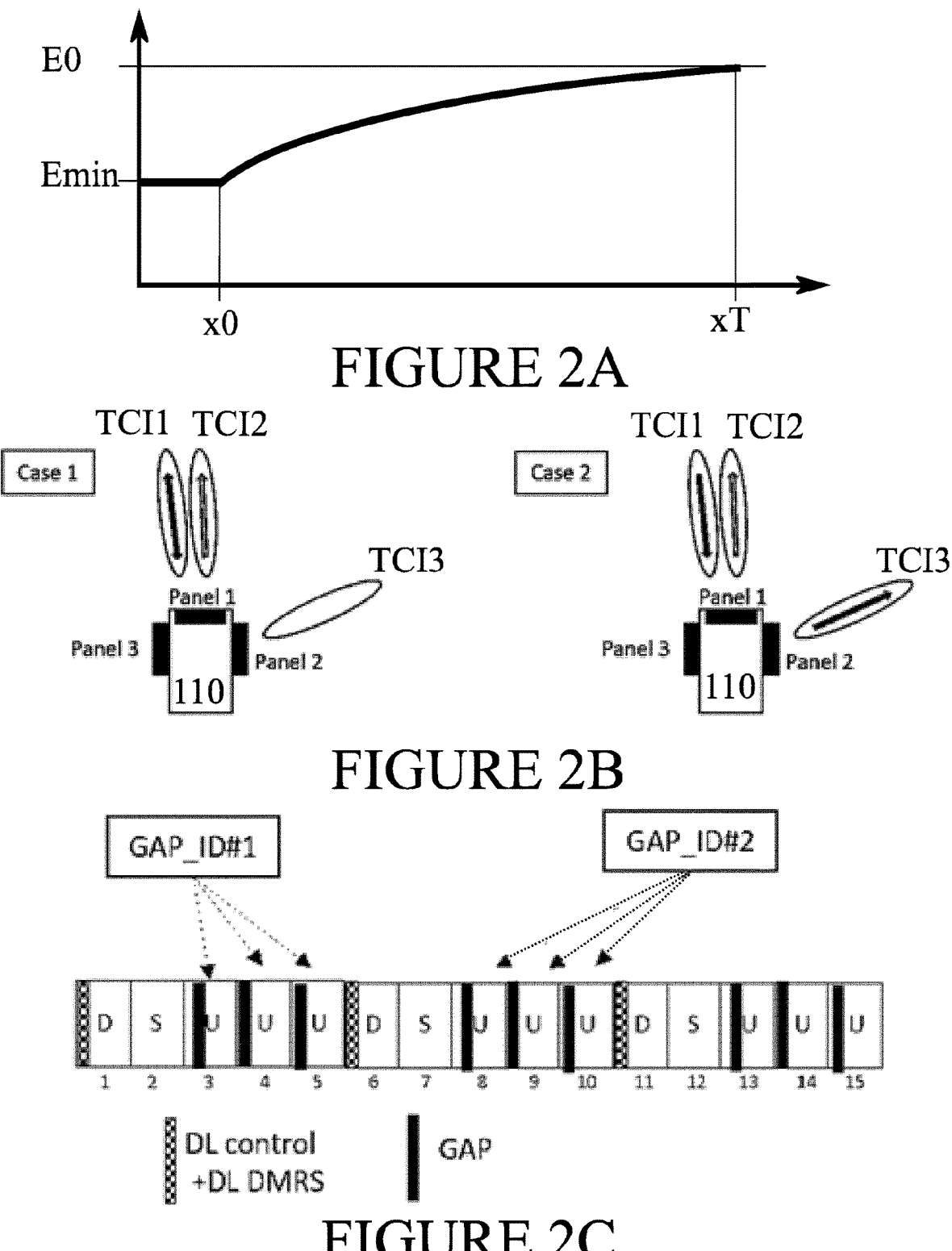
FIG. 2A illustrates an example exposure limit.
FIG. 2B illustrates example UE transmission configurations.
FIG. 2C illustrates an example gap configuration.

FIG. 2A illustrates an example exposure limit (the thick black curve). In the figure, UL transmit power increases upward on the vertical axis, and distance 115 between the UE and the user increases along the horizontal axis from the left toward the right. When distance 115 is the trigger distance xT, the UE may transmit at the nominal maximum transmit power E0. The thick curve illustrates the increasing reduction in maximum transmit power as distance 115 declines, until at distance x0 between user and UE, a maximum reduction is applied resulting in maximally reduced transmit power Emin.

One way to reduce the uplink transmit power is to keep the transmitter off for time periods in between active transmissions, rather than limit the instantaneous maximum transmit power. For example, only transmitting in every tenth slot using the nominal power corresponds to a reduction of 90% in the transmit power defined as an average over time.

FIG. 2B illustrates example UE transmission configurations. The signals which are received/transmitted by the UE are governed transmission configurations, of which an example in 3GPP systems is transmission configuration indicator, TCI, state. A TCI state defines a quasi co location, QCL, source and QCL type for a target reference signal and hence indicates a transmission configuration which includes QCL-relationships between the downlink reference signals in one reference signal set. The notion of UE antenna array is not specified as such in industry specifications, but in practice the downlink, DL, and uplink, UL, signals characterized by the TCIs are received only by a subset of arrays/panels used by the UE and these arrays/panels receiving reference signals characterized by TCI are active panels used in the actual downlink and uplink transmission. Two possible configurations where the UE is receiving multiple signals on multiple panels are in FIG. 2B, Case 1 and Case 2. In Case 1 the UE uses the beam characterized by TCI1 for DL and UL transmission, such that the UE is using the same UE spatial filter used for reception and transmission, while the beam characterized by TCI2 is used only for UL transmission. Another TCI state, TCI3, is configured for signals received by panel 2.

In Case 2, TCI1 characterizes a DL beam, TCI2 characterizes an UL beam, both being handled by the same panel, Panel 1. TCI3 is a beam transmitted by panel 2. In both these cases, the UE needs to perform measurement detection for the UL beams, hence for signals characterized by TCI1 and TCI2 in Case 1 and for signals characterized by TCI2 and TCI3 in Case 2, so that all uplink beams are scanned for the presence of the user. This means that in Case 1 measurement gaps to enable using the panels as radars to determine the distance the user (if present) are needed for Panel 1 and in Case 2 measurement gaps are needed for Panels 1 and 2. The gaps are, in general, periods in time when the uplink is paused, to allow the antenna arrays to be used for another purpose, such as transmitting and receiving a radio signal, the round trip time between transmission and reception, indicating if any blockage is present.

The pool of UE devices needing gaps to determine the distance to the user, or to an object, can be classified into devices which are able to activate multiple panels in the same time to perform distance measurements, and devices which are able to activate only a single panel at a time in radar mode, and hence which need a larger number of transmission gaps in time to scan all the active antenna arrays. For devices capable of performing distance measurements at the same time using multiple antenna arrays, the distance measurement of multiple antenna arrays at the same time might be problematic as the transmissions from the antenna arrays may interfere with each other, for example depending on array placement and radar beam shape. This could necessitate a more accurate detection process. For this reason, it may be preferable to perform sequential array distance measurements even with devices which could perform proximity detection with all antenna arrays at the same time. Per array, distance measurements may further consume a lot of resources.

In FIG. 2B, in Case 1, TCI1 and TCI2 would require only a single configured gap as they are handled by the same antenna array, Panel 1. It is beneficial for the base station to know that TCI1 and TCI2 are will use the same gap. If TCI3 is a DL signal, it does not require a gap and hence Panel 2 would not need a gap in Case 1. In Case 2, TCI2 and TCI3 are UL signals, hence each needs a gap if the UE is not able to perform distance measurements on both antenna arrays, Panel 1 and Panel 2. Hence is beneficial to associate the gap need to the TCI state, indicating to the base station, for example, that TCI2 needs GAP_ID #1 and TCI3 needs GAP_ID #2, indicating the need for two gap configurations. Note that the number of GAP_IDs may be further factorized by a repetition factor as for each GAP_ID, multiple time configurations may be needed so that the UE is enabled to collect more samples. Thus each gap configuration may comprise plural actual gaps, repeated in time. When gaps are requested for specific TCIs, the base station may configure the gaps on those specific TCIs, which provides the benefit that the gaps are then available on the arrays the UE actually needs to measure on.

Concerning the last embodiment mentioned above, wherein gaps may be requested in terms of an overall gap budget, in terms of Case 2 of FIG. 2B, the UE might request two gaps with separate gap identities, for example. This would not be as effective, however, as requesting the gaps to be configured more specifically on the antenna arrays (via the transmission configuration(s)) where they are needed.

FIG. 2C illustrates an example gap configuration. Two gap identities, GAP_IDs, are configured, for specific configured transmission configuration states of the UE. The gaps are in uplink slots, U, in a frame structure also comprising downlink slots, D, and control information such as demodulation reference signals, DMRS. In other embodiments, gaps may be configured in downlink slots, and the gaps may be interleaved in time between the antenna arrays. Associating gap configuration with configured transmission configuration states may be conducted whether the gaps are in uplink or downlink slots. DL signals can be grouped if they are received by the same spatial filter, and UL signals can be grouped based on the GAP_ID. A UE capable of, and desiring to, perform distance measurements on multiple panels in the same time, can also tag the same GAP_ID to all the UL TCIs. As illustrated, the gaps may defines plural gaps occurring with a fixed periodicity.

Requesting gap allocation on specific TCIs scales gap utilization with regard to the panels which are used for transmission, and hence should be considered for distance measurements. Indeed, in the example from FIG. 2B, Panel 3 is not configured with any TCI. Even if this panel may also receive radio signals, distance measurements should not be a priority for the network, and the present disclosure concentrated on network configured gaps. Panel 3 may perform disclosure measurements in a UE implementation specific manner without network-configured gaps. It is possible that the UE uses gaps configured for active arrays also to perform measurements from inactive panels.

While the TCI based grouping is a workable solution, the present disclosure is not limited to the procedures described above. The per-antenna array gaps may be also transmitted via PUCCH-SpatialRelationInfo.

Figure 3:
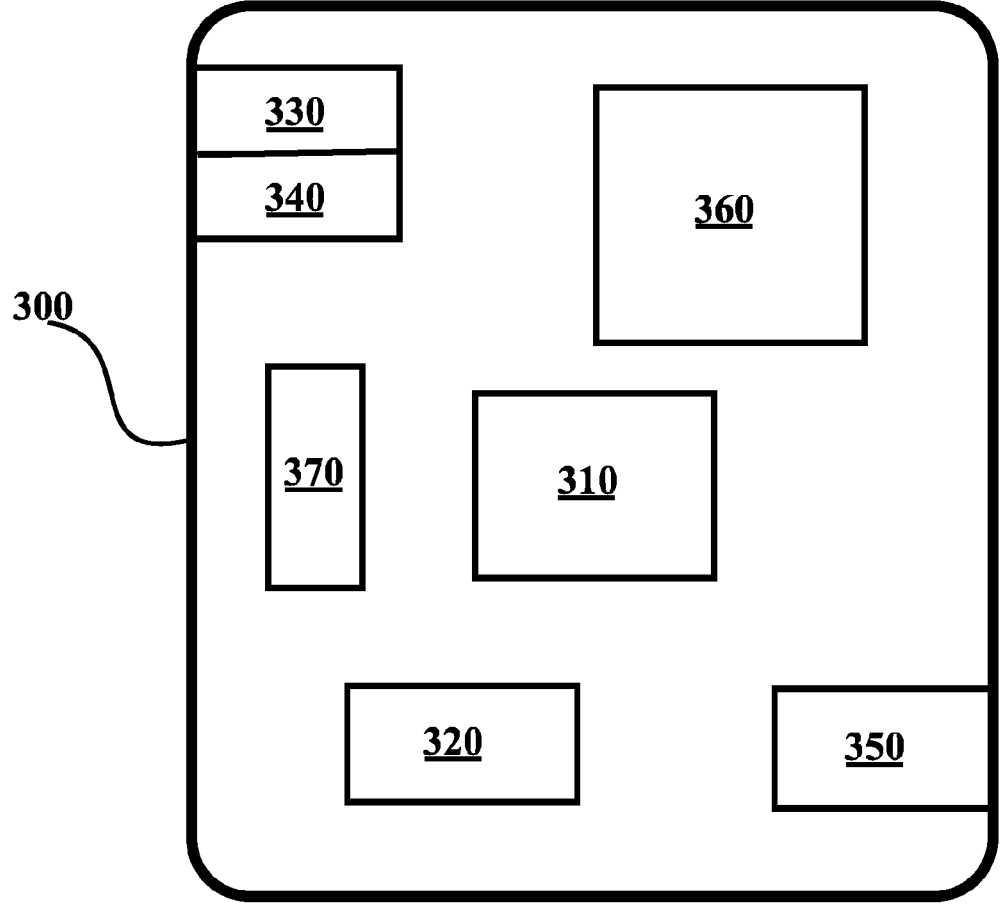
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, UE 110 of FIG. 1 or, in applicable parts, base station 120 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300 such as transmitting, using, reducing and receiving. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a user equipment or base station, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
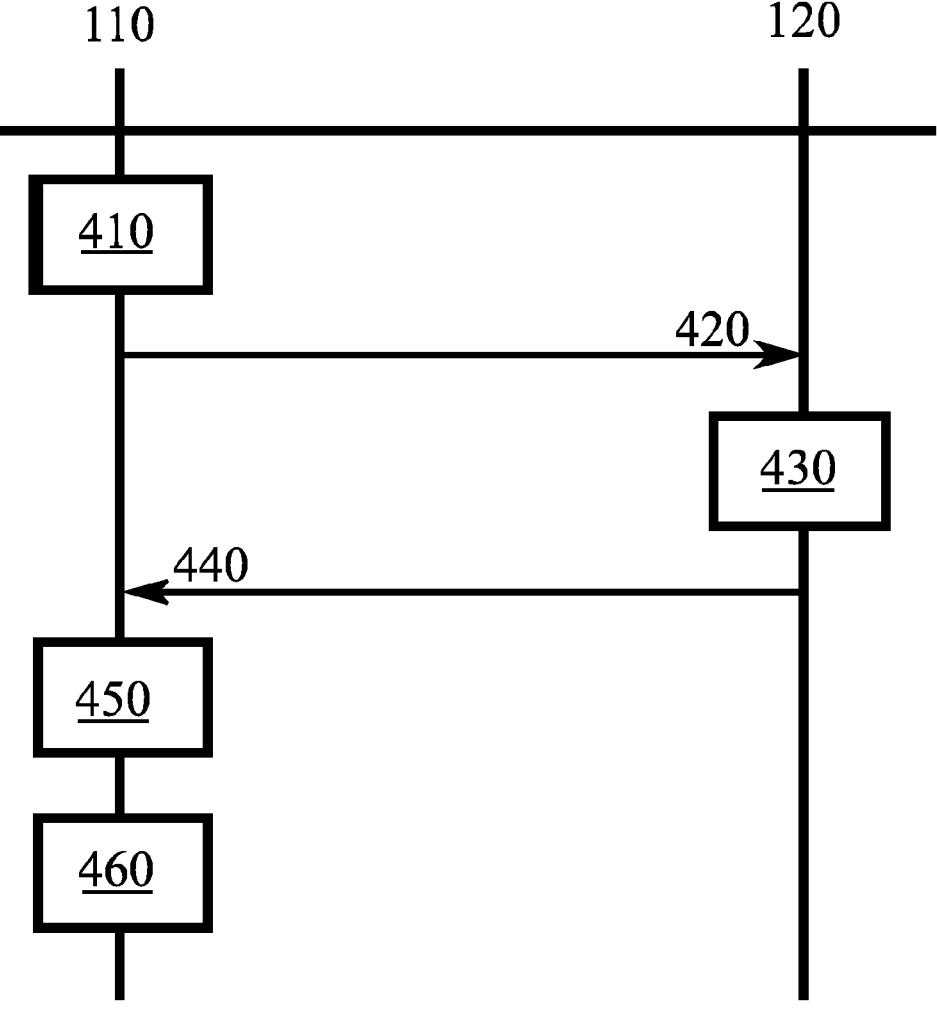
FIG. 4 illustrates signalling in accordance with at least some embodiments of the present invention.

FIG. 4 illustrates signalling in accordance with at least some embodiments of the present invention. On the vertical axes are disposed, on the left, UE 110 of FIG. 1, and on the right, base station 120 of FIG. 1. Time advances from the top toward the bottom.

In phase 410, UE 110 decides that it will seek to determine the distance 115 between UE 110 and the user 160, or between UE 110 and an object. Further, in this phase UE 110 may determine the configured transmission configurations, such as UL and/or DL TCI states, it has been configured with by the base station, which as described above affects which ones of the antenna arrays of UE 110 transmit data in the uplink. Exposure limits only apply in the uplink direction, since downlink is received from the base station and does not involve transmission from the UE.

In phase 420, UE 110 transmits to base station 120 a request to have gaps configured in the uplink and/or downlink transmission of the UE. As described above, this request may comprise requesting gaps to be configured in specific ones of the configured transmission configurations, to enable determining the distance 115 using the antenna arrays of UE 110 as radar(s). For example, UE 110 may request a gap configuration such that each antenna array active in the uplink un UE 110 is requested to be configured with a gap, in a corresponding configured transmission configuration served by the antenna array. In case multiple configured transmission configurations originate at the UE on a same antenna array, a single gap configuration may be requested in phase 420 for this antenna array, on one of the configured transmission configurations originating on the antenna array. This may utilize, for example, uplink TCI grouping in requesting one or more gap configuration(s). The gaps, as configured by the base station, may occupy uplink slots, downlink slots or both uplink and downlink slots.

In phase 430 the base station responsively decides on gap configurations responsive to the request of phase 420. Base station 120 may consider buffer status, time elapsed since expiry of a previous gap configuration and data flow priorities when deciding whether to grant the request of phase 420, and if yes when to grant it.

In phase 440, the base station provides the gap configuration(s) to UE 110. This constitutes the act of configuring the gaps by the base station. In response, in phase 450 the UE acts on the gap configuration of phase 440 and modifies its uplink transmission, and in phase 460 the UE uses the configured gaps to determine distance 115 between UE 110 and user 160, or between UE 110 and an object, as the UE may be unable to differentiate between humans and objects. As described above, in case distance 115 is less than the trigger distance the UE may be compelled to reduce its maximum uplink transmission power to avoid exceeding a configured exposure limit.

FIG. 5 is a flow graph of a method in accordance with at least some embodiments of the present invention. The phases of the illustrated method may be performed in UE 110, or in a control device configured to control the functioning thereof, when installed therein.

Phase 510 comprises transmitting, from an apparatus to a base station node, a request for at least one gap to be configured in an uplink transmission and/or downlink reception of the apparatus. Phase 520 comprises, during at least one configured gap of the apparatus, using at least one antenna array of the apparatus as a radar to determine a distance between the apparatus and a user or an object. Phase 530 comprises, responsive to the determined distance being less than a preconfigured trigger distance, reducing a transmission power of the apparatus by a factor chosen in dependence of by how much the determined distance is less than the trigger distance.

Figure 6:
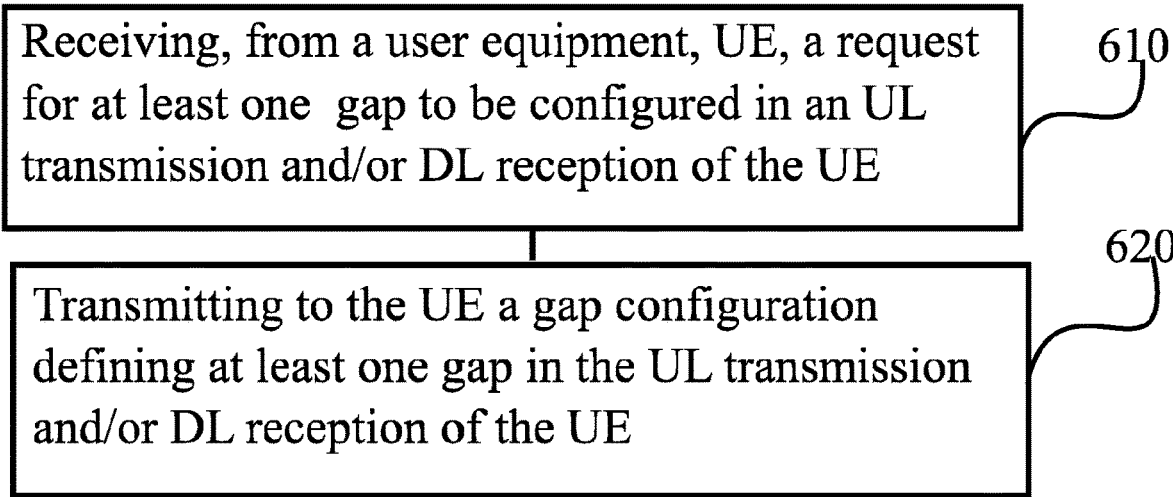
FIG. 6 is a flow graph of a method in accordance with at least some embodiments of the present invention.

FIG. 6 is a flow graph of a method in accordance with at least some embodiments of the present invention. The phases of the illustrated method may be performed in base station 120, or in a control device configured to control the functioning thereof, when installed therein.

Phase 610 comprises receiving, from a user equipment, a request for at least one transmission gap to be configured in an uplink and/or downlink transmission of the user equipment. Finally, phase 620 comprises transmitting to the user equipment a gap configuration defining at least one gap in the uplink and/or downlink transmission of the user equipment.

Figures 7A, 7B:
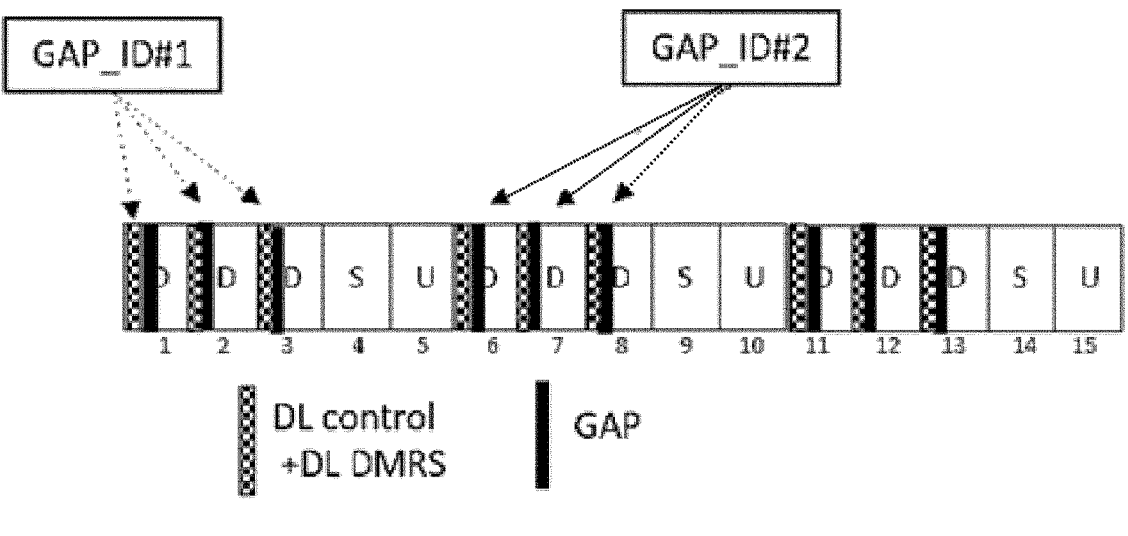
FIGS. 7A and 7B illustrate examples of gap configurations.

FIGS. 7A and 7B illustrate examples of gap configurations. In FIG. 7A, gaps are configured in downlink slots and in the case of FIG. 7B, gaps are configured in an interleaved manner.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing exposure of users to radiation.

Acronyms List

EHF extremely high frequency (24-300 GHz)
EIRP effective isotropic radiated power
DL downlink
MPE maximum permissible exposure
QCL quasi co location
TCI transmission configuration indicator
UE user equipment
UL uplink

| REFERENCE SIGNS LIST | |
| --- | --- |
| 110 | UE |
| 120 | Base station |
| 130 | Building |
| 140, 150 | Radio path |
| 112b, 114b | Beam |
| 115 | UE-user distance |
| 160 | User |
| 300-370 | Structure of the apparatus of FIG. 3 |
| 410-460 | Phases of signalling in FIG. 4 |
| 510-530 | Phases of the method in FIG. 5 |
| 610-620 | Phases of the method in FIG. 6 |

Technical Clauses

Clause 1. An apparatus comprising at least one processing core, at least one memory including computer program code, the at least one memory and the computer program code being configured to, with the at least one processing core, cause the apparatus at least to:

transmit, to a base station node, a request for at least one gap to be configured in an uplink transmission and/or downlink reception of the apparatus;

during at least one configured gap of the apparatus, use at least one antenna array of the apparatus as a radar to determine a distance between the apparatus and a user or an object, and

13

14 responsive to the determined distance being less than a preconfigured trigger distance, reduce a transmission power of the apparatus by a factor chosen in dependence of by how much the determined distance is less than the trigger distance.

Clause 2. The apparatus according to Clause 1, wherein the at least one memory and the computer program code are configured to, with the at least one processing core, cause the apparatus to include in the request only a request for exactly one transmission gap, and wherein the apparatus is configured to perform the determining of the distance to the user simultaneously using plural configured antenna arrays of the apparatus.

Clause 3. The apparatus according to Clause 1, wherein the at least one memory and the computer program code are configured to, with the at least one processing core, cause the apparatus to include in the request at least one request for gap configuration in a specific configured transmission configuration state of the apparatus, the specific configured transmission configuration being comprised in a proper subset of active transmission configurations of the apparatus which are received and/or transmitted from a same antenna array of the apparatus.

Clause 4. The apparatus according to Clause 1, wherein the at least one memory and the computer program code are configured to, with the at least one processing core, cause the apparatus to include in the request a request for a specific number of gaps such that the requested gaps are not associated in the request with specific configured transmission configuration states of the apparatus.

Clause 5. The apparatus according to any of Clauses 1-4, wherein the apparatus is configured to use each of the at least one antenna array for communication in a frequency range of between 24 and 300 gigahertz.

Clause 6. The apparatus according to any of Clauses 1-5, wherein the apparatus is configured to process a gap configuration from the base station node, the gap configuration defining the at least one configured gap.

Clause 7. The apparatus according to Clause 6, wherein the gap configuration defines plural gaps occurring with a fixed periodicity.

Clause 8. The apparatus according to any of Clauses 1-7, wherein the apparatus comprises a user equipment configured to operate based on cellular communication standards.

Clause 9. An apparatus comprising at least one processing core, at least one memory including computer program code, the at least one memory and the computer program code being configured to, with the at least one processing core, cause the apparatus at least to:

receive, from a user equipment, a request for at least one gap to be configured in an uplink transmission and/or downlink reception of the user equipment, and transmit to the user equipment a gap configuration defining at least one gap in the uplink transmission and/or the downlink reception of the user equipment.

Clause 10. The apparatus according to Clause 9, wherein the at least one memory and the computer program code are configured to, with the at least one processing core, cause the apparatus to include in the gap configuration only a configuration for exactly one transmission gap.

Clause 11. The apparatus according to Clause 9, wherein the at least one memory and the computer program code are configured to, with the at least one processing core, cause the apparatus to include in the gap configuration at least one configuration for a gap in a specific configured transmission configuration state of the user equipment, the specific configured transmission configuration being comprised in only a subset of active transmission configurations of the user equipment.

Clause 12. The apparatus according to Clause 9, wherein the at least one memory and the computer program code are configured to, with the at least one processing core, cause the apparatus to include in the gap configuration a configuration for a specific number of gaps such that the gaps are not associated in the gap configuration with specific configured transmission configuration states of the user equipment.

Clause 13. A method comprising:

transmitting, from an apparatus to a base station node, a request for at least one gap to be configured in an uplink transmission and/or downlink reception of the apparatus;

during at least one configured gap of the apparatus, using at least one antenna array of the apparatus as a radar to determine a distance between the apparatus and a user or an object, and responsive to the determined distance being less than a preconfigured trigger distance, reducing a transmission power of the apparatus by a factor chosen in dependence of by how much the determined distance is less than the trigger distance.

Clause 14. The method according to Clause 13, wherein method comprises including in the request only a request for exactly one transmission gap, and performing the determining of the distance to the user simultaneously using plural active antenna arrays of the apparatus.

Clause 15. The method according to Clause 13, wherein the method comprises including in the request at least one request for gap configuration in a specific configured transmission configuration state of the apparatus, the specific configured transmission configuration being comprised in a proper subset of active transmission configurations of the apparatus which are received and/or transmitted from a same antenna array of the apparatus.

Clause 16. The method according to Clause 13, wherein the method comprises including in the request a request for a specific number of gaps such that the requested gaps are not associated in the request with specific configured transmission configuration states of the apparatus.

Clause 17. A method, comprising:

receiving, from a user equipment, a request for at least one gap to be configured in an uplink transmission and/or downlink reception of the user equipment, and transmitting to the user equipment a gap configuration defining at least one gap in the uplink transmission and/or the downlink reception of the user equipment.

Clause 18. The method according to claim Clause 17, comprising including in the gap configuration only a configuration for exactly one transmission gap.

Clause 19. The method according to Clause 17, comprising including in the gap configuration at least one configuration for a gap in a specific configured transmission configuration state of the user equipment, the specific configured transmission configuration being associated with only a subset of active transmission configurations of the user equipment.

Clause 20. The method according to Clause 17, comprising include in the gap configuration a configuration for a specific number of gaps such that the gaps are not associated in the gap configuration with specific configured transmission configuration states of the user equipment.

Clause 21. An apparatus comprising:

means for transmitting, from an apparatus to a base station node, a request for at least one gap to be configured in an uplink transmission and/or downlink reception of the apparatus;

means for, during at least one configured gap of the apparatus, using at least one antenna array of the apparatus as a radar to determine a distance between the apparatus and a user or an object, and means for, responsive to the determined distance being less than a preconfigured trigger distance, reducing a transmission power of the apparatus by a factor chosen in dependence of by how much the determined distance is less than the trigger distance.

Clause 22. An apparatus comprising:

means for receiving, from a user equipment, a request for at least one gap to be configured in an uplink transmission and/or downlink reception of the user equipment, and means for transmitting to the user equipment a gap configuration defining at least one gap in the uplink transmission and/or the downlink reception of the user equipment.

Clause 23. A non-transitory computer readable medium having stored thereon a set of computer readable instructions that, when executed by at least one processor, cause an apparatus to at least:

transmit, to a base station node, a request for at least one gap to be configured in an uplink transmission and/or downlink reception of the apparatus;

during at least one configured gap of the apparatus, use at least one antenna array of the apparatus as a radar to determine a distance between the apparatus and a user or an object, and responsive to the determined distance being less than a preconfigured trigger distance, reduce a transmission power of the apparatus by a factor chosen in dependence of by how much the determined distance is less than the trigger distance.

Clause 24. A non-transitory computer readable medium having stored thereon a set of computer readable instructions that, when executed by at least one processor, cause an apparatus to at least:

receive, from a user equipment, a request for at least one gap to be configured in an uplink transmission and/or downlink reception of the user equipment, and transmit to the user equipment a gap configuration defining at least one gap in the uplink transmission and/or the downlink reception of the user equipment.

The invention claimed is:

1. An apparatus comprising at least one processing core, at least one memory including computer program code, the at least one memory and the computer program code being configured to, with the at least one processing core, cause the apparatus at least to:

transmit, to a base station node, a request for a plurality of gaps to be configured in an uplink transmission and downlink reception of the apparatus, the plurality of gaps comprising a first configured gap (GAP_ID #1) and a second configured gap (GAP_ID #2), wherein:

GAP_ID #1 comprises plural gaps repeated in time and is used for a first transmission configuration indicator (TCI1) of a first antenna array panel and for a second transmission configuration indicator (TCI2) of the first antenna array panel, GAP_ID #2 comprises plural gaps repeated in time and is used for a third configuration indicator (TCI3) of a second antenna array panel, the plural gaps of GAP_ID #1 are interleaved with the plural gaps of GAP_ID #2, and the apparatus is not able to simultaneously perform distance measurements on both the first antenna array panel and the second antenna array panel; and during the interleaved plural gaps of GAP_ID #1 and GAP_ID #2, alternate using the first antenna array panel and the second antenna array panel of the apparatus as a radar to determine a distance between the apparatus and a user;

responsive to the determined distance being less than a preconfigured trigger distance, reduce a transmission power of the apparatus by a factor chosen in dependence of by how much the determined distance is less than the trigger distance; and include in the request a request for a specific number of gaps such that the requested gaps are not associated in the request with specific configured transmission configuration states of the apparatus, wherein the apparatus is configured to use each of the first antenna array panel and the second antenna array panel for communication in a frequency range of between 24 and 300 gigahertz, wherein the apparatus is configured to process a gap configuration from the base station node, wherein the gap configuration defines plural gaps occurring with a fixed periodicity, and wherein the apparatus comprises a user equipment configured to operate based on cellular communication standards.

* * * * *